US012720531B2

(12) United States Patent
Deghel et al.

(10) Patent No.: US 12,720,531 B2
(45) Date of Patent: Aug. 25, 2026

(54) CONFIGURED GRANT BASED MULTI-TRP

(71) Applicant: Nokia Technologies Oy, Espoo (FI)

(72) Inventors: Matha Deghel, Massy (FR); Ping-Heng Kuo, Cambridge (GB); Keeth Saliya Jayasinghe Laddu, Espoo (FI); Youngsoo Yuk, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 456 days.

(21) Appl. No.: 18/261,222

(22) PCT Filed: Jan. 5, 2022

(86) PCT No.: PCT/EP2022/050115
§ 371 (c)(1),
(2) Date: Jul. 12, 2023

(87) PCT Pub. No.: WO2022/152599
PCT Pub. Date: Jul. 21, 2022

(65) Prior Publication Data

US 2024/0073891 A1 Feb. 29, 2024

(30) Foreign Application Priority Data

Jan. 18, 2021 (GB) ...................................... 2100647

(51) Int. Cl.
*H04W 72/1268* (2023.01)
*H04L 1/1812* (2023.01)
*H04L 1/1867* (2023.01)

(52) U.S. Cl.
CPC ....... *H04W 72/1268* (2013.01); *H04L 1/1812* (2013.01); *H04L 1/1874* (2013.01)

(58) Field of Classification Search
CPC . H04W 72/1268; H04L 1/1812; H04L 1/1874
See application file for complete search history.

(56) References Cited

U.S. PATENT DOCUMENTS

2012/0269140 A1 10/2012 Nam et al.
2013/0170457 A1 7/2013 Pelletier et al.
(Continued)

FOREIGN PATENT DOCUMENTS

EP 3648383 A1 5/2020
WO 2020/033689 A1 2/2020
(Continued)

OTHER PUBLICATIONS

"New WID: Further enhancements on MIMO for NR", 3GPP TSG RAN Meeting #86, RP-193133, Agenda: 9.1.1, Samsung, Dec. 9-12, 2019, 5 pages.

(Continued)

*Primary Examiner* — Rebecca E Song
*Assistant Examiner* — Shu Liu
(74) *Attorney, Agent, or Firm* — Carter, DeLuca & Farrell LLP

(57) ABSTRACT

An apparatus comprising means for: receiving at least one configuration message; determining at least a first uplink resource associating to a first configured grant configuration and a second uplink resource associating to a second configured grant configuration based on the at least one configuration message; generating a transport block; transmitting the transport block on the first uplink resource associating to the first configured grant configuration via a first channel; transmitting the transport block on the second uplink resource associating to the second configured grant configuration via a second channel, wherein the first configured grant configuration is different to the second configured grant configuration, and wherein the first channel is different to the second channel.

17 Claims, 8 Drawing Sheets

(56) References Cited

U.S. PATENT DOCUMENTS

Figure 1:
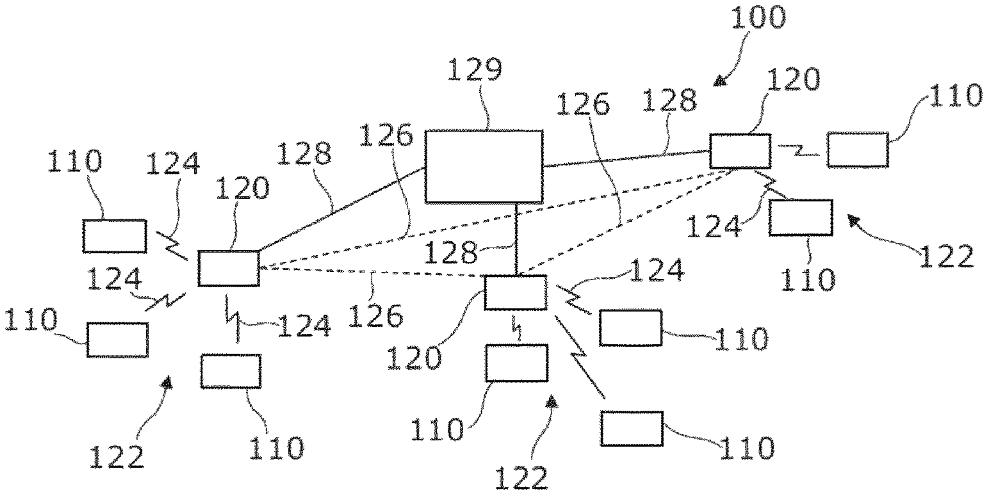

| | | | | |
|---|---|---|---|---|
| 2019/0254067 | A1 | 8/2019 | Al-Imari et al. | |
| 2020/0037347 | A1 | 1/2020 | Yang et al. | |
| 2020/0107170 | A1 | 4/2020 | Chen et al. | |
| 2020/0154469 | A1* | 5/2020 | Chin | H04L 1/1822 |
| 2020/0260486 | A1 | 8/2020 | Zhou et al. | |
| 2020/0367208 | A1 | 11/2020 | Khoshnevisan et al. | |
| 2020/0413427 | A1 | 12/2020 | Khoshnevisan et al. | |
| 2021/0184819 | A1* | 6/2021 | Takeda | H04W 24/10 |
| 2022/0225287 | A1* | 7/2022 | Zhang | H04W 72/56 |
| 2024/0056230 | A1* | 2/2024 | Jiang | H04W 72/115 |
| 2024/0057075 | A1* | 2/2024 | Xiao | H04L 1/1822 |

FOREIGN PATENT DOCUMENTS

| | | | |
|---|---|---|---|
| WO | 2020/044409 | A1 | 3/2020 |
| WO | 2020/145320 | A1 | 7/2020 |
| WO | 2020/155097 | A1 | 8/2020 |
| WO | 2020/168223 | A1 | 8/2020 |
| WO | 2020/252174 | A1 | 12/2020 |

OTHER PUBLICATIONS

"Summary of AI:8.1.2.1 Enhancements for Multi-TRP URLLC for PUCCH and PUSCH", 3GPP TSG RAN WG1 #103, R1-200xxxx, Agenda: 8.1.2.1, Nokia, Oct. 26-Nov. 13, 2020, 43 pages.
Search Report received for corresponding United Kingdom Patent Application No. 2100647.3, dated Feb. 26, 2021, 4 pages.
International Search Report and Written Opinion received for corresponding Patent Cooperation Treaty Application No. PCT/EP2022/050115, dated Apr. 26, 2022, 14 pages.
"Further discussion on enhancement of MTRP operation", 3GPP TSG RAN WG1 #103-e, R1-2007645, Agenda: 8.1.2.1, vivo, Oct. 26-Nov. 13, 2020, 15 pages.
"Enhanced UL transmission with configured grant for URLLC", 3GPP TSG RAN WG1 Ad-Hoc Meeting 1901, R1-1900974, Agenda: 7.2.6.3, NTT Docomo Inc, Jan. 21-25, 2019, 13 pages.
Office action received for corresponding United Kingdom Patent Application No. 2100647.3, dated Dec. 1, 2022, 4 pages.
Office action received for corresponding United Kingdom Patent Application No. 2305848.0, dated Jun. 16, 2023, 4 pages.

* cited by examiner $120_1$ $120_2$

UE

110

31

41

21

CG 1

ULR 1

10

CG 2

ULR 2

32

42

22

81

61

50

71

Tx 1

TB

50

TB

82

Tx 2

TB

72

50

62

CONFIGURED GRANT BASED MULTI-TRP

RELATED APPLICATION

This application was originally filed as PCT Application No. PCT/EP2022/050115 on Jan. 5, 2022, which claims priority from Great Britain Application No. 2100647.3, filed on Jan. 18, 2021, each of which is incorporated herein by reference in its entirety.

TECHNOLOGICAL FIELD

Embodiments of the present disclosure relate to configured grant. Some relate to performance of configured grant at a mobile equipment.

BACKGROUND

Configured grant enables scheduling, by a network, of uplink transmissions used by user equipment. The time resources (transmission occasions) and spectrum resources for use by the user equipment are communicated, directly or indirectly, using one or more configuration messages sent from the network to the user equipment. The configuration message or a first configuration message is sent to the user equipment in advance.

BRIEF SUMMARY

It would be desirable to use configured grant to enable transmission of a transport block to not just one network access point but to multiple access points using configured grant.

According to various, but not necessarily all, embodiments there is provided an apparatus comprising means for:

receiving at least one configuration message;

determining at least a first uplink resource associating to a first configured grant configuration and a second uplink resource associating to a second configured grant configuration based on the at least one configuration message;

generating a transport block;

transmitting the transport block on the first uplink resource associating to the first configured grant configuration via a first channel;

transmitting the transport block on the second uplink resource associating to the second configured grant configuration via a second channel, wherein the first configured grant configuration is different to the second configured grant configuration, and wherein the first channel is different to the second channel.

In some but not necessarily all examples, the means for transmitting the transport block on the first uplink resource via the first channel comprises means for:

performing at least one repetition of the transport block on at least one transmission occasion of the first uplink resource and via the first channel; and wherein the means for transmitting the transport block on the second uplink resource via the second channel comprises:

performing at least one repetition of the transport block on at least one first transmission occasion of the second uplink resource and via the second channel.

In some but not necessarily all examples, the apparatus comprises one or more timers, wherein repetition of the transport block on the first uplink resource via the first channel and repetition of the transport block on the second uplink resource via the second channel are contemporaneous and occur with a time period controlled by the one or more timers.

In some but not necessarily all examples, the apparatus comprises a first timer and a second timer, wherein availability of the at least one transmission occasion defined by the first uplink resource is dependent upon a status of the first timer started by an initial transmission of the transport block on the first uplink resource via the first channel, and wherein availability of the at least one transmission occasion defined by the second uplink resource is dependent upon a status of the second timer started by an initial transmission of the transport block on the second uplink resource via the second channel.

In some but not necessarily all examples, the first uplink resource comprises at least one transmission occasion of a Physical Uplink Shared Channel (PUSCH) and the second uplink resource comprises at least one transmission occasion of the PUSCH, wherein the first channel is associated with a first transmission/reception point (TRP) and the second channel is associated with a second TRP different to the first TRP, the apparatus enabling multi-TRP configured grant PUSCH repetition operation.

In some but not necessarily all examples, the configuration message causes association, at the apparatus, of the first configured grant configuration and the second configured grant configuration.

In some but not necessarily all examples, the configuration message explicitly associates the first configured grant configuration and the second configured grant configuration.

In some but not necessarily all examples, the configuration message associates a first HARQ process corresponding to the first configured grant configuration and a second HARQ process corresponding to the second configured grant configuration.

In some but not necessarily all examples, the apparatus comprises means for selecting at least one of the first uplink resource and the second uplink resource from a pool of available uplink resources.

In some but not necessarily all examples, the first configured grant configuration enables, at the apparatus, periodic transmission on first specific resource blocks, and wherein the second configured grant configuration enables, at the apparatus, periodic transmission on second specific resource blocks, wherein the first and second resources blocks are distinct.

In some but not necessarily all examples, the first channel is associated with a first transmission/reception point (TRP) and the second channel is associated with a second TRP different to the first TRP.

In some but not necessarily all examples, the first channel is associated with a first uplink beam and the second channel is associated with a second uplink beam.

In some but not necessarily all examples, the apparatus comprises means for:

receiving at least one further configuration message;

determining at least a third uplink resource associating to a third configured grant configuration;

transmitting the transport block on the third uplink resource associating to the third configured grant configuration via a third channel;

wherein the third configured grant configuration is different to the first and second configured grant configurations, and wherein the third channel is different to the first and second channels.

In some but not necessarily all examples, transmission of the transport block on the first uplink resource via the first channel uses a HARQ process identified by a HARQ process identifier and wherein transmission of the transport block on the second uplink resource via the second channel uses the same HARQ process identified by the same HARQ process identifier.

In some but not necessarily all examples, repetitions of the transport block on the first uplink resource via the first channel use a HARQ process identified by a HARQ process identifier and repetitions of the transport block on the second uplink resource via the second channel use the same HARQ process identified by the same HARQ process identifier.

In some but not necessarily all examples, a single timer reserves resources for re-transmission of the transport block, with repetitions, via the first channel and re-transmission of the transport block, with repetitions, via the second channel.

In some but not necessarily all examples, transmission of the transport block on the first uplink resource via the first channel uses a first HARQ process identified by a first HARQ process identifier and wherein transmission of the transport block on the second uplink resource via the second channel uses a second HARQ process identified by a second HARQ process identifier, different to the first HARQ process identifier.

In some but not necessarily all examples, the apparatus comprises repetitions of the transport block on the first uplink resource via the first channel use a first HARQ process identified by a first HARQ process identifier and wherein repetitions of the transport block on the second uplink resource via the second channel uses a second HARQ process identified by a second HARQ process identifier, different to the first HARQ process identifier.

In some but not necessarily all examples, one or more timers reserve first uplink resources associating to a first configured grant configuration for re-transmission of the transport block via the first channel and reserve second uplink resources associating to a second configured grant configuration for re-transmission of the transport block via the second channel, wherein separate buffers are available for each timer for storing the transport block, wherein where more than one buffer is used to store the transport block, the buffers are cleared independently in dependence upon their respective timers or the buffers are cleared together in dependence upon one of the respective timers.

In some but not necessarily all examples, the at least one configuration message controls an association of the first configured grant configuration and the second configured grant configuration In some but not necessarily all examples, the second uplink resource is selected from a pool of available uplink resources.

In some but not necessarily all examples, the at least one configuration message controls an association of a first HARQ process identifier and a second HARQ process identifier.

In some but not necessarily all examples, the apparatus comprises means for selecting the second HARQ process identifier from a set of available HARQ process identifiers comprising the first HARQ process identifier.

In some but not necessarily all examples, the selection is dependent upon the transport block.

In some but not necessarily all examples, the apparatus is mobile equipment or user equipment.

According to various, but not necessarily all, embodiments there is provided a system comprising the apparatus as user equipment and comprising multiple network access nodes, wherein the one or more network access nodes are configured to activate and de-activate: association of the first configured grant configuration and the second configured grant configuration and/or association of HARQ processes corresponding to configured grant configurations.

According to various, but not necessarily all, embodiments there is provided a computer program comprising program instructions for causing an apparatus to perform at least the following:

obtaining at least a first uplink resource associating to a first configured grant configuration and a second uplink resource associating to a second configured grant configuration based on the at least one configuration message;

causing transmission of a transport block on the first uplink resource associating to the first configured grant configuration via a first channel;

causing transmission of the transport block on the second uplink resource associating to the second configured grant configuration via a second channel, wherein the first configured grant configuration is different to the second configured grant configuration, and wherein the first channel is different to the second channel.

According to various, but not necessarily all, embodiments there is provided a method comprising:

receiving at least one configuration message;

determining at least a first uplink resource associating to a first configured grant configuration and a second uplink resource associating to a second configured grant configuration based on the at least one configuration message;

generating a transport block;

transmitting the transport block on the first uplink resource associating to the first configured grant configuration via a first channel;

transmitting the transport block on the second uplink resource associating to the second configured grant configuration via a second channel, wherein the first configured grant configuration is different to the second configured grant configuration, and wherein the first channel is different to the second channel.

According to various, but not necessarily all, embodiments there is provided an apparatus comprising:

at least one processor; and at least one memory including computer program code the at least one memory and the computer program code configured to, with the at least one processor, cause the apparatus at least to perform:

obtaining at least a first uplink resource associating to a first configured grant configuration and a second uplink resource associating to a second configured grant configuration based on the at least one configuration message;

causing transmission of a transport block on the first uplink resource associating to the first configured grant configuration via a first channel;

causing transmission of the transport block on the second uplink resource associating to the second configured grant configuration via a second channel, wherein the first configured grant configuration is different to the second configured grant configuration, and wherein the first channel is different to the second channel.

According to various, but not necessarily all, embodiments there is provided a non-transitory computer readable medium comprising instructions stored thereon for performing at least the following:

obtaining at least a first uplink resource associating to a first configured grant configuration and a second uplink resource associating to a second configured grant configuration based on the at least one configuration message;

causing transmission of a transport block on the first uplink resource associating to the first configured grant configuration via a first channel;

causing transmission of the transport block on the second uplink resource associating to the second configured grant configuration via a second channel, wherein the first configured grant configuration is different to the second configured grant configuration, and wherein the first channel is different to the second channel.

According to various, but not necessarily all, embodiments there is provided an apparatus comprising means for:

receiving, at least, a configuration message;

determining at least one of a first configured grant resource and a second configured grant resource based on the received configuration message;

repetitively transmitting a transport block on the first configured grant resource using a first channel;

repetitively transmitting a transport block on the second configured grant resource using a second channel, wherein the first configured grant resource is different to the second configured grant resource, and wherein the first channel is different to the second channel.

The first configured grant resource corresponds to a first configured grant. The second configured grant resource corresponds to a second configured grant. The first configured grant is different to the second configured grant.

According to various, but not necessarily all, embodiments there is provided an apparatus comprising means for:

using a first configured grant to time repetition of a transport block in a first uplink channel;

using a second configured grant to time repetition of the same transport block in a second uplink channel, wherein the first configured grant is different to the second configured grant and wherein the first channel is different to the second channel.

According to various, but not necessarily all, embodiments there is provided an apparatus comprising means for:

receiving a configuration message;

determining at least one of a first configured grant resource and a second configured grant resource based on the configuration message;

using one or more repetitions of a transport block on the first configured grant resource to transfer the transport block via a first channel;

using one or more repetitions of a transport block on the second configured grant resource to transfer the transport block via a second channel, wherein the first configured grant resource is different to the second configured grant resource, and wherein the first channel is different to the second channel.

The first configured grant resource corresponds to a first configured grant. The second configured grant resource corresponds to a second configured grant. The first configured grant is different to the second configured grant.

According to various, but not necessarily all, embodiments there is provided an apparatus comprising:

at least one processor; and at least one memory including computer program code the at least one memory and the computer program code configured to, with the at least one processor, cause the apparatus at least to perform:

receiving at least one configuration message;

determining at least a first uplink resource associating to a first configured grant configuration and a second uplink resource associating to a second configured grant configuration based on the at least one configuration message;

generating a transport block;

transmitting the transport block on the first uplink resource associating to the first configured grant configuration via a first channel;

transmitting the transport block on the second uplink resource associating to the second configured grant configuration via a second channel, wherein the first configured grant configuration is different to the second configured grant configuration, and wherein the first channel is different to the second channel.

The first configured grant resource corresponds to a first configured grant. The second configured grant resource corresponds to a second configured grant. The first configured grant is different to the second configured grant.

According to various, but not necessarily all, embodiments there is provided examples as claimed in the appended claims.

BRIEF DESCRIPTION

Some examples will now be described with reference to the accompanying drawings in which:

FIGS. 1 to 13 show examples of the subject matter described herein.

ACRONYMS

5G—5th Generation
gNB—5G/NR base station
NR—New Radio
RAN—Radio Access Network
UE—User Equipment
TRP—Transmission Reception Point
UL—Uplink
DL—Downlink
DCI—Downlink Control Information
MAC CE—Medium Access Control TARP Element
PUCCH—Physical Uplink Control Channel
PUSCH—Physical Uplink Shared Channel
PDCCH—Physical Downlink Control Channel
PDSCH—Physical Downlink Shared Channel
PRI—PUCCH Resource Index
TCI—Transmission Configuration Indicator
TDM—Time Division Multiplexing
UCI—Uplink Control Information
FR 1—Frequency Range 1
SR—Scheduling Request
SPS—Semi-Persistent Scheduling
CSI—Channel State Information
HARQ—Hybrid Automatic Repeat request
HARQ-ACK—HARQ Acknowledgment
CCE—Control Channel Element
CORESET—Control Resource Set
TB—Transport Block
CG—Configured grant
PID—process ID
LCH—Logical Channel
SRS—Sounding Reference Signal
SRI—SRS resource indicator

DETAILED DESCRIPTION

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

In this example, the access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In the particular example illustrated the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

A user equipment comprises a mobile equipment. Where reference is made to user equipment that reference includes and encompasses, wherever possible, a reference to mobile equipment.

The whole of this disclosure relates to various examples of an apparatus comprising means for:

- receiving at least one configuration message 10;
- determining at least a first uplink resource 21 associating 41 to a first configured grant configuration 31 and a second uplink resource 22 associating 42 to a second configured grant configuration 32 based on the at least one configuration message 10;
- generating a transport block (TB) 50;
- transmitting the transport block 50 on the first uplink resource 21 associating to the first configured grant configuration 31 via a first channel 81;
- transmitting the transport block 50 on the second uplink resource 22 associating to the second configured grant configuration 32 via a second channel 82, wherein the first configured grant configuration 31 is different to the second configured grant configuration 32, and wherein the first channel 81 is different to the second channel 82.

The apparatus is a material object that is capable of performing the functions described. The apparatus 110 can, for example, be a terminal node. The "means for" is that part or parts of the apparatus 110 that is capable of performing the functions described. Receiving means obtaining. Determining means obtaining through a process.

Configured grant provides, in advance, an uplink resource allocation that can be used for autonomously starting uplink transmission(s). It can provide all or part of the uplink resource allocation that can be used for uplink transmission(s).

In current 3GPP specifications, configured grant allows for uplink transmission on the Physical Uplink Shared Channel (PUSCH) without having to receive dynamic allocation on the Physical Downlink Control Channel (PDCCH). The configured grant allocates at least time resources and frequency resources that enable periodic transmission on a set of (frequency) resource blocks. It also provides a specific Modulation and Coding Scheme.

A Type 1 configured grant is fully configured by Radio Resource Control (RRC) signaling. The RRC ConfiguredGrantConfig IE comprises rrc-ConfiguredUplinkGrant IE.

A Type 2 configured grant has some uplink resource allocation via RRC signalling and some via PDCCH signalling which also acts as an activation trigger. The RRC ConfiguredGrantConfig IE does not comprise rrc-ConfiguredUplinkGrant IE.

The RRC ConfiguredGrantConfig IE includes various parameters including: nrofHARQ-Processes which is used to determine at least one HARQ Process ID for use;

- repK IE which indicates a number of PUSCH repetitions (repetitions are transmitted at transmission occasions (TOs));
- periodicity indicates a time period between allocated configured grant resources (i.e. between two bundles of transmission occasions (TOs), where each bundle contains repK TOs);
- configuredGrantTimer 74 defines a period that a UE waits for a re-transmission request (if any) after transmitting an uplink packet.

The configured grant configuration 31, 32 is the information used to configure a configured grant. It is the configuration provided or enabled by RRC signaling (e.g. ConfiguredGrantConfig IE) for Type 1 configured grant. It is the configuration provided or enabled by the combination of RRC signaling (e.g. ConfiguredGrantConfig IE) and PDCCH activation signaling (DCI) for Type 2.

For Type 1, transmission occasions are defined relative to a parameter in the configured grant configuration 31, 32 (ConfiguredGrantConfig IE), for example, timeDomainOffset.

For Type-2, transmission occasions, are defined relative to an uplink resource allocation in the activation in PDCCH. PDCCH provides the activation with resource allocation in DCI addressed to the UE with an address (e.g. Configured Scheduling Radio Network Temporary Identifier (CS-RNTI)) that is not allocated via a configured grant configuration 31, 32.

A configuration message 10 is a message that configures operation of the apparatus 110. It directly or indirectly allocates uplink resources.

Uplink is the direction from the apparatus 110 to a network access node uplink: in 3GPP from UE to access node 120.

Uplink transmission from different apparatuses 110 use different centrally allocated uplink resources to allow distinct transmissions and reduce/control interference between transmissions. An uplink resource 21, 22 can, for example consist of at least a time domain resource allocation and/or a frequency domain resource allocation. A time domain resource allocation is an allocation in the time domain that indicates a start (for example a transmission occasion) and can indicate a combination of a start and a duration; the number of repetitions can also be seen as part of the time domain allocation. A frequency domain resource allocation (or frequency domain resource) is an allocation of a part of the frequency domain, for example, allocation of (frequency) resource block(s).

An uplink resource 21, 22 associating or corresponding 41, 42 to a configured grant configuration 31, 32 is an uplink resource 21, 22 determined by or using the configured grant configuration 31, 32.

A configured grant resource is an uplink resource 21, 22 determined by or using the configured grant configuration 31, 32.

A (frequency) resource block is a block of resources in the frequency domain. In 3GPP a resource frequency resource block, called Resource Block, occupies 12 consecutive subcarriers in the frequency domain. The Resource Block has a bandwidth that depends upon subcarrier spacing.

A transport block 50 is a block of data for transmission. In 3GPP it is a block of data passed between the Medium Access Control (MAC) and physical (PHY) layers. The transport block 50 undergoes PHY layer processing before being mapped on the PUSCH for transmission. The PHY layer processes a single transport block 50 for each resource allocation.

Transmitting the transport block 50 on an uplink resource 21, 22 associating 41, 42 to a configured grant configuration 31, 32, for example, includes transmitting the transport block 50 on a configured grant resource. The transmitting of the transport block could be repeated ('repetitions' are transmitted at transmission occasions).

The uplink resource 21, 22 can, for example, define a bundle of one or more transmission occasions that repeats in time based on some periodicity determined by the configured grant configuration 31, 32. When an occasion in a bundle is used, it is referred to as a 'repetition'. The set of (one or more) repetitions performed within a bundle is described as an initial transmission or retransmission (or simply transmission). Transmitting the transport block 50 on a resource associating to a configured grant configuration 31, 32 can comprise transmitting a set of (one or more) repetitions that each use transmission occasions in the bundle and comprise the transport block 50.

The same transport block 50 can be sent via two different channels 81, 82 using one or more repetitions of the transport block 50 in a channel 81, 82.

Figure 2:
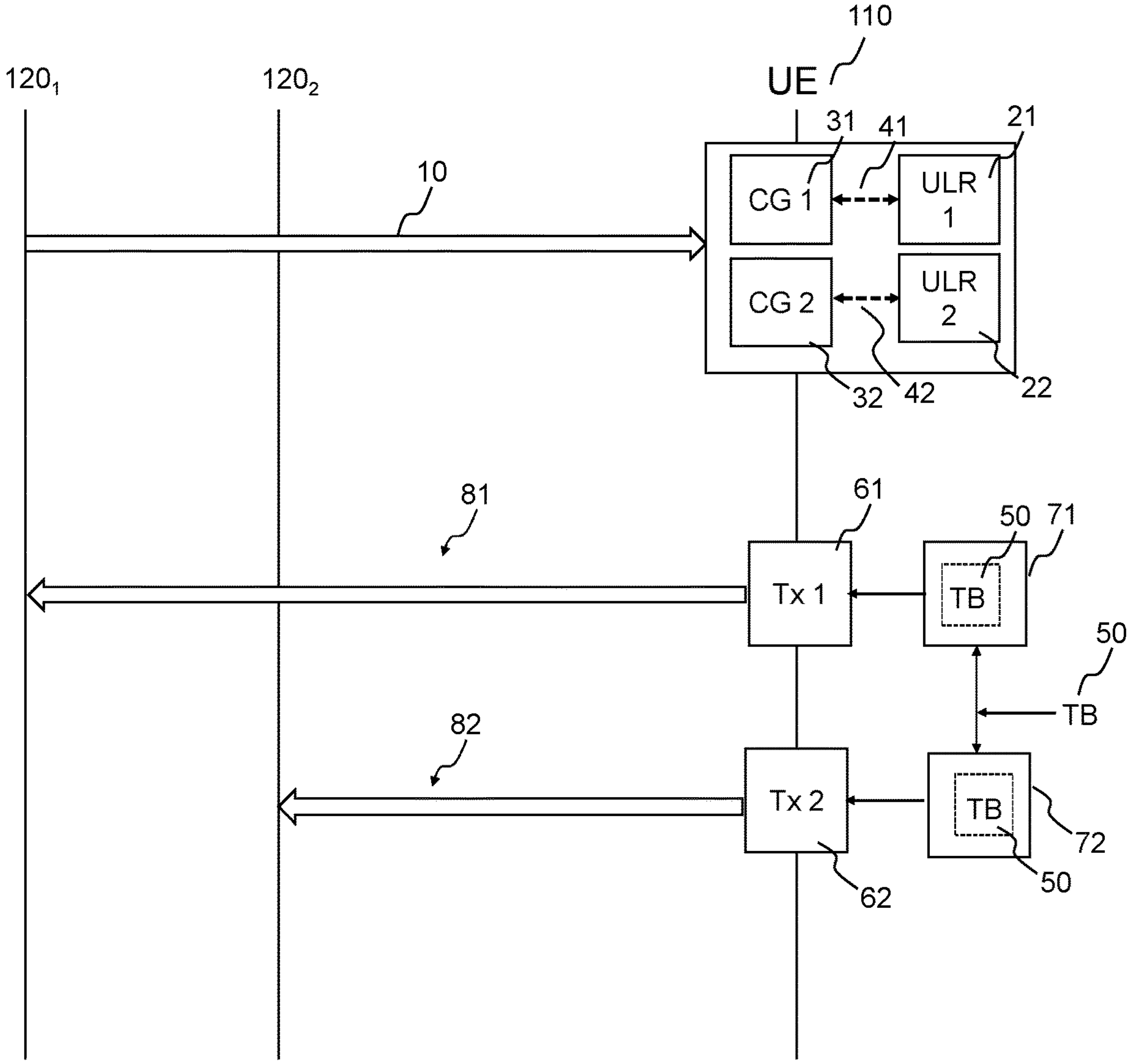

FIG. 2 illustrates an example of an apparatus 110 comprising means for:

- receiving at least one configuration message 10;
- determining at least a first uplink resource 21 associating 41 to a first configured grant configuration 31 and a second uplink resource 22 associating 42 to a second configured grant configuration 32 based on the at least one configuration message 10;
- generating a transport block (TB) 50;
- transmitting the transport block 50 on the first uplink resource 21 associating to the first configured grant configuration 31 via a first channel 81;
- transmitting the transport block 50 on the second uplink resource 22 associating to the second configured grant configuration 32 via a second channel 82, wherein the first configured grant configuration 31 is different to the second configured grant configuration 32, and wherein the first channel 81 is different to the second channel 82.

The apparatus 110 is, in this example but not necessarily all examples, mobile equipment or user equipment The configuration message 10 causes association of the first configured grant configuration 31 and the second configured grant configuration 32.

The at least one configuration message 10 can be received as a Radio Resource Control (RRC) message, for example, as a Type 1 configured grant RRC message or a Type 2 configured grant RRC message. Alternatively, or additionally, at least part of the at least configuration message can be received via DCI, MAC CE, and/or RRC.

In this example, the first configured grant configuration 31 enables periodic transmission on first specific resource blocks, and the second configured grant configuration 32 enables periodic transmission on second specific resource blocks. The first and second resources blocks are distinct.

In this example, the first channel 81 is associated with a first network access node $\mathbf{120}_1$, for example a first transmission/reception point (TRP) and the second channel 82 is associated with a second network access node $\mathbf{120}_2$, for example a second transmission/reception point (TRP).

The first channel 81 can, for example be a first spatial path or spatial channel. The first channel 81 can, for example be associated with a first uplink beam. An uplink (Tx) beam may refer to or be represented by: uplink TCI, SRS resource indicator, uplink spatial filter, spatial relation, and/or quasi-colocation assumption.

The second channel 82 can, for example be a second spatial path or spatial channel. The second channel 82 can, for example be associated with a second uplink beam that is different to the first uplink beam (e.g. spatially diverse). An uplink (Tx) beam may refer to or be represented by: uplink TCI, SRS resource indicator, uplink spatial filter, and/or spatial relation, and/or quasi-colocation assumption.

Although FIG. 2 only illustrates transmitting the transport block 50 on the first uplink resource 21 via the first channel 81 and transmitting the same transport block 50 on the second uplink resource 22 via the second channel 82, the same transport block 50 can be transmitted on additional uplink resources via additional channels.

Thus in at least some examples, the apparatus 110 comprises means for: receiving at least one further configuration message 10;

- determining at least a third uplink resource associating to a third configured grant configuration;
- transmitting the transport block 50 on the third uplink resource associating to the third configured grant configuration via a third channel.

In at least some examples, the third configured grant configuration is different to the first and second configured grant configurations 31, 32. Additionally or alternatively, in at least some examples, the third channel is different to the first and second channels 81, 81.

Figure 3:
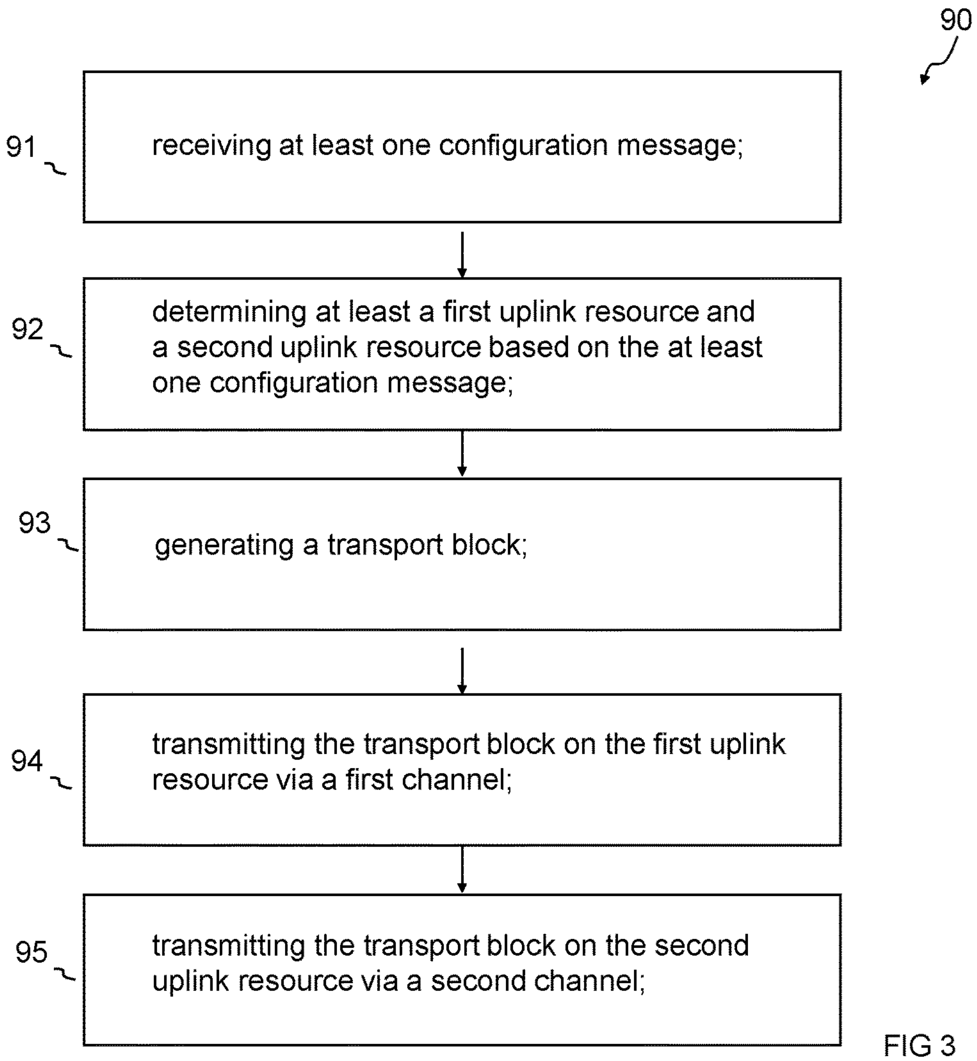

FIG. 3 illustrates an example of a method 90. The method 90, at block 91, comprises receiving at least one configuration message 10.

The method 90, at block 92, comprises: determining at least a first uplink resource 21 associating 41 to a first configured grant configuration 31 and a second uplink resource 22 associating 42 to a second configured grant configuration 32 based on the at least one configuration message 10.

The determining is based on the at least one configuration message. The determining produces at least a first uplink resource 21 associating 41 to a first configured grant configuration 31 and a second uplink resource 22 associating 42 to a second configured grant configuration 32.

The method 90, at block 93, comprises generating a transport block 50.

The method 90, at block 94, comprises transmitting the transport block 50 on the first uplink resource 21 associating 41 to the first configured grant configuration 31 via a first channel 81.

The method 90, at block 95, comprises transmitting the transport block 50 on the second uplink resource 22 associating 42 to the second configured grant configuration 32 via a second channel 82.

The first configured grant configuration 31 is different to the second configured grant configuration 32. The first channel 81 is different to the second channel 82.

One or more of the network nodes 120 can be configured to activate/deactivate the method 90 at the apparatus 110. In FIG. 2 the transport block 50 can be held at first buffer circuitry 71 for transmission (with or without repetition) and for re-transmission (with or without repetition) via the first channel 81 and the transport block 50 can be held at second buffer circuitry 72 for transmission (with or without repetition) and for re-transmission (with or without repetition) via the second channel 82.

Figure 4:
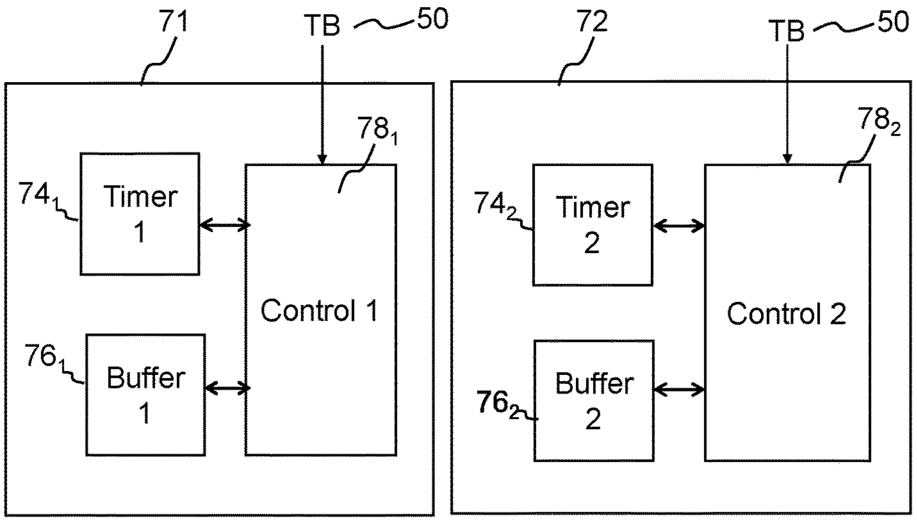

An example of the first buffer circuitry 71 and an example of the second buffer circuitry 72 is illustrated in FIG. 4.

The first buffer circuitry 71 comprises timer $\mathbf{74}_1$, a buffer $\mathbf{76}_1$ and control circuitry $\mathbf{78}_1$. The timer $\mathbf{74}_1$ can for example reserve first uplink resources 21 associating to the first configured grant configuration 31 for re-transmission of the transport block 50 via the first channel 81. The timer $\mathbf{74}_1$ can be used by the control circuitry $\mathbf{78}_1$ to control the buffer $\mathbf{76}_1$.

The second buffer circuitry 72 comprises timer $\mathbf{74}_2$, a buffer $\mathbf{76}_2$ and control circuitry $\mathbf{78}_2$. The timer $\mathbf{74}_2$ can for example reserve second uplink resources 22 associating to the second configured grant configuration 32 for re-transmission of the transport block 50 via the second channel 82. The timer $\mathbf{74}_2$ can be used by the control circuitry $\mathbf{78}_2$ to control the buffer $\mathbf{76}_2$.

In some examples, the buffer $\mathbf{76}_1$ can be cleared independently of the buffer $\mathbf{76}_2$, under the control of timer $\mathbf{74}_1$ and the independently buffer $\mathbf{76}_2$ can be cleared independently of the buffer $\mathbf{76}_1$, under the control of timer $\mathbf{74}_2$. However, in other examples, the buffer $\mathbf{76}_1$ and the buffer $\mathbf{76}_2$ can be cleared simultaneously under the control of timer $\mathbf{74}_2$ and/or timer $\mathbf{74}_1$.

There is a timer $\mathbf{74}_1$, $\mathbf{74}_2$ corresponding to a HARQ process. The apparatus 110 assumes a positive acknowledgement if the timer $\mathbf{74}_1$, $\mathbf{74}_2$ expires. This allows apparatus 110 to subsequently transfer a new transport block 50 using the same HARQ process. If the timer $\mathbf{74}_1$, $\mathbf{74}_2$ has not expired (or been cleared) its corresponding/associated HARQ process is locked and the apparatus 110 cannot transfer a new transport block 50 using the same HARQ process. The HARQ process is 'locked' awaiting a potential re-transmission grant relating to the previously transmitted transport block.

An access node 120 can use PDCCH to grant a re-transmission of a transport block 50, that is, dynamic grants can be used to allocate uplink resources for re-transmission. The appropriate timer $\mathbf{74}_1$, $\mathbf{74}_2$ is cleared and re-started for each such re-transmission.

In at least some examples, repetition of the transport block 50 on the first uplink resource 21 via the first channel 81 and repetition of the transport block 50 on the second uplink resource 22 via the second channel 82 are contemporaneous and occur with a time period controlled by one or more timers $\mathbf{74}_1$, $\mathbf{74}_2$.

Figure 5:
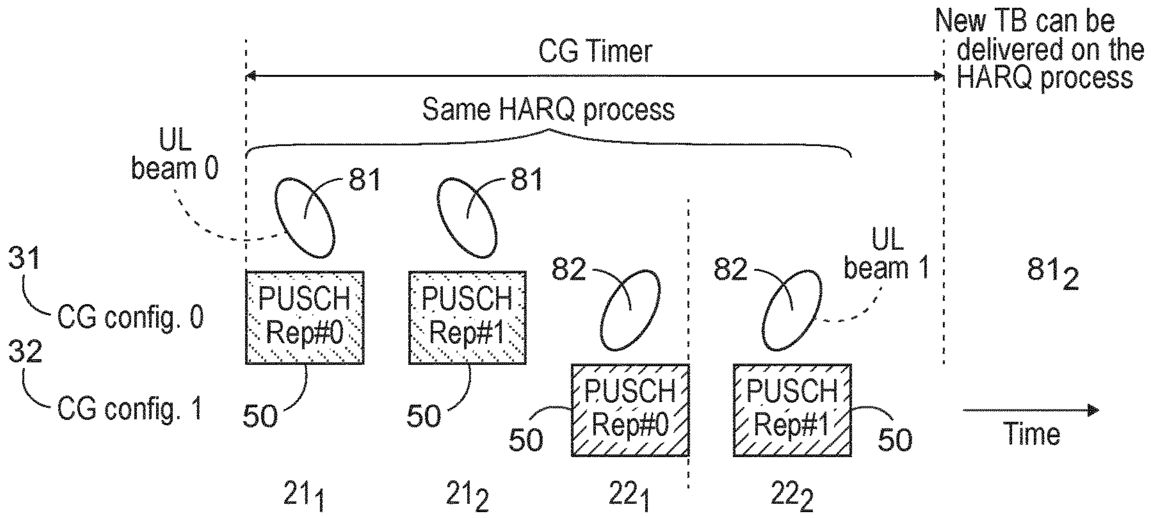
Figure 6:
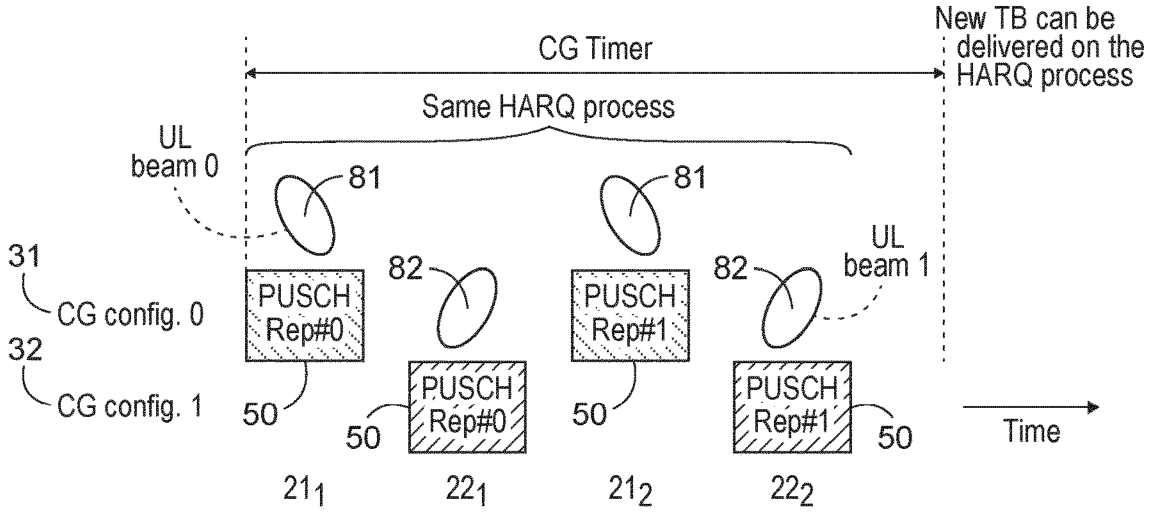
Figure 7:
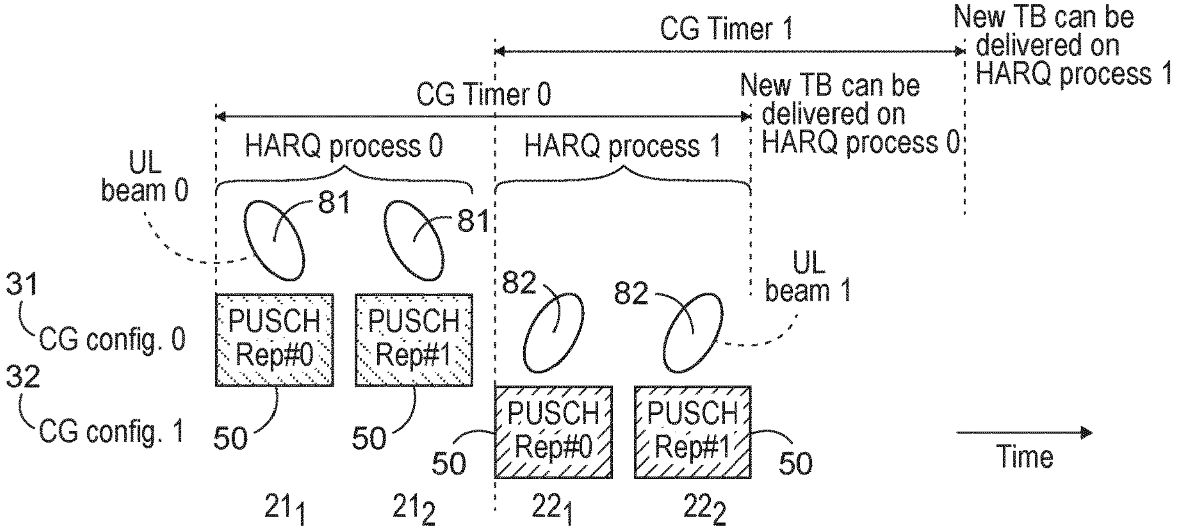

FIGS. 5, 6 & 7 illustrate examples of transmitting the transport block 50 on the first uplink resource 21 associating to the first configured grant configuration 31 via a first channel 81 and transmitting the transport block 50 on the second uplink resource 22 associating to the second configured grant configuration 32 via a second channel 82.

In these examples, but not necessarily all examples, there is repetition (per channel) of the transport block 50.

The means for transmitting the transport block 50 on the first uplink resource 21 associating 41 to the first configured grant configuration 31 via a first channel 81 comprises means for: performing at least one repetition of the transport block on at least one transmission occasion of the first uplink resource and via the first channel.

The means for performing at least one repetition of the transport block on at least one transmission occasion of the first uplink resource and via the first channel can, for example, comprise means for:

performing one repetition of the transport block 50, at a first transmission occasion $\mathbf{21}_1$ of the first uplink resource 21 associated with the first configured grant configuration 31, via the first channel 81; and performing one repetition of the transport block 50 at a second transmission occasion $\mathbf{21}_2$ of the first uplink resource 21 associated with the first configured grant configuration 31, via the first channel 81.

The means for transmitting the transport block 50 on the second uplink resource 22 associating 42 to the second configured grant configuration 32 via a second channel 82 comprises means for: performing at least one repetition of the transport block on at least one first transmission occasion of the second uplink resource and via the second channel.

The means for performing at least one repetition of the transport block on at least one first transmission occasion of the second uplink resource and via the second channel can, for example, comprise means for: performing one repetition of the transport block 50 at a first transmission occasion $\mathbf{22}_1$ of the second uplink resource 22 associated with the second configured grant configuration 32, via the second channel 82; and performing one repetition of the transport block 50 at a second transmission occasion $\mathbf{22}_2$ of the second uplink resource 22 associated with the second configured grant configuration 32, via the second channel 82.

In at least some examples, the repetition of the transport block 50 on the first uplink resource 21 via the first channel 81 and repetition of the transport block 50 on the second uplink resource 22 via the second channel 82 are contemporaneous and occur with a time period controlled by one or more timers 74.

In some examples, the availability of the first transmission occasion and the second transmission occasion defined by the first configured grant resource is dependent upon a status of a first timer $\mathbf{74}_1$ (re)-started by an initial transmission (or retransmission) of the transport block 50 on the first uplink resource 21 via the first channel 81, and the availability of the first transmission occasion and the second transmission occasion defined by the second configured grant resource is dependent upon a status of a second timer $\mathbf{74}_2$ started by an initial transmission of the transport block 50 on the second uplink resource 22 via the second channel 82.

In a 3GPP implementation according to the present specifications, the transmission occasions 21 are transmission occasions of a Physical Uplink Shared Channel (PUSCH).

The first channel 81 can be associated with a first transmission/reception point (TRP) and the second channel 82 can be associated with a second TRP different to the first TRP. The apparatus 110 can therefore enable multi-TRP configured grant PUSCH repetition. A TRP may be identified using a CORESET pool index and/or using a subset of reference signals.

In some examples, at least one of the first uplink resource 21 (e.g. a transmission occasion) and the second uplink resource 22 (e.g. a transmission occasion) are selected from a pool of available uplink resources.

In the example illustrated in FIGS. 5 & 6, the configuration message 10 associates the first configured grant configuration 31 and the second configured grant configuration 32.

Transmission of the transport block 50 on the first uplink resource 21 via the first channel 81 uses a HARQ process identified by a HARQ process identifier and transmission of the transport block 50 on the second uplink resource 22 via the second channel 82 uses the same HARQ process identified by the same HARQ process identifier.

Repetitions of the transport block 50 on the first uplink resource 21 via the first channel 81 use a HARQ process identified by a HARQ process identifier and wherein repetitions of the transport block 50 on the second uplink resource 22 via the second channel 82 use the same HARQ process identified by the same HARQ process identifier.

A single timer 74 can reserve resources for re-transmission of the transport block 50, with repetitions, via the first channel 81 and re-transmission of the transport block 50, with repetitions, via the second channel 82.

In the example illustrated in FIG. 7, the configuration message 10 associates a first HARQ process corresponding to the first configured grant configuration and a second HARQ process corresponding to the second configured grant configuration. The configuration message 10 associates a first HARQ process, for use by the first uplink resource 21 associating 41 to the first configured grant configuration 31, and a second HARQ process, for use by the second uplink resource 22 associating 42 to the second configured grant configuration 32. In one example, at least one configuration message 10 controls an association of the first configured grant configuration 31 and the second configured grant configuration 32.

In another example, the at least one configuration message 10 controls an association of a first HARQ process identifier and a second HARQ process identifier The second HARQ process identifier can be selected from a set of available HARQ identifiers comprising the first HARQ process identifier. The selection can be dependent upon the transport block 50.

One or more network access nodes 120 can be configured to activate and de-activate: association of the first configured grant configuration and the second configured grant configuration and/or association of HARQ processes corresponding to configured grant configurations.

The transmission of the transport block 50 on the first uplink resource 21 via the first channel 81 uses a first HARQ process identified by a first HARQ process identifier wherein transmission of the transport block 50 on the second uplink resource 22 via the second channel 82 uses a second HARQ process identified by a second HARQ process identifier, different to the first HARQ process identifier.

Repetitions of the transport block 50 on the first uplink resource 21 via the first channel 81 uses a first HARQ process identified by a first HARQ process identifier wherein repetitions of the transport block 50 on the second uplink resource 22 via the second channel 82 uses a second HARQ process identified by a second HARQ process identifier, different to the first HARQ process identifier The examples described enable multi-TRP PUSCH repetition using configured grant and, in particular, multi-TRP PUSCH repetition under which a TB is repeated/transmitted towards two TRPs using more than one configured-grant configuration. A transport block cab be transmitted towards a multiple TRPs. More specifically, multiple Tx beam (i.e. spatial relation) in uplink can be used to transmit a transport block.

Multi-TRP configured-grant PUSCH repetition operation, is enabled by associating/linking at least two configured-grant configurations and/or at least two HARQ processes.

In some examples, at least two configured-grant configurations are implicitly and/or explicitly linked/associated in a specific way.

In some examples, at least one second configured-grant configuration/HARQ process is selected to be used as secondary resource for a first configured-grant configuration/HARQ process based on some preconfigured rules/conditions.

In some examples, at least two HARQ processes are associated in a specific way.

The specific association and operation could be based on at least one of the following ways/alternatives:

Note that for some of the various alternative examples, a configured grant configuration 31, 32 is configured or indicated uplink beam information. The term uplink beam may also be referred to as spatial relation info or uplink TCI (transmission configuration indicator) state.

Alt.1: Implicit linkage/association of at least two configured-grant configurations:

At least two configured grant (CG) configurations 31, 32 are allowed to share at least one HARQ process. That is, two or more CG configurations 31, 32 could be implicitly deemed as coupled if they share at least one HARQ process.

MAC instructs PHY to transmit a TB 50 using at least two such configured-grant configurations 31, 32 on a same HARQ process, i.e. HARQ process that is shared between these selected configurations 31, 32.

The apparatus (UE 110) thus uses the PUSCH resources 21, 22 from each of the selected configured-grant configurations 31, 32, from the PUSCH occasions that correspond to the same HARQ process ID, for the transmission of the TB 50.

The configured-grant timer (CG timer) 74 corresponding to the HARQ process starts or restarts when the first/earliest PUSCH repetition is performed.

The configured-grant timer value, which is configured as part of each configured-grant configuration 31, 32, is expected to be the same for the selected configurations 31, 32.

In a variant, the configured-grant timer value, which is configured as part of each configured-grant configuration 31, 32, does not necessarily need to be the same for the selected configurations 31, 32, in which case the apparatus (UE 110) could be configured to select the smaller or higher value.

Alternatively, the apparatus (UE 110) could be configured to use the CG timer value in the configuration whose PUSCH for this multi-TRP operation is used the earliest or the latest.

Alternatively, the apparatus (UE 110) could be configured to use the CG timer value in the CG configuration with the lower/higher index.

The TB 50 stored in the HARQ buffer 76 is kept until the corresponding configured-grant timer 74 expires.

The network can dynamically enable or disable all the above operation. For instance, for configured-grant Type 2, such enabling/disabling can be done via DCI activating or reactivating any of the at least two linked configured grant configurations 31, 32.

Figure 8:
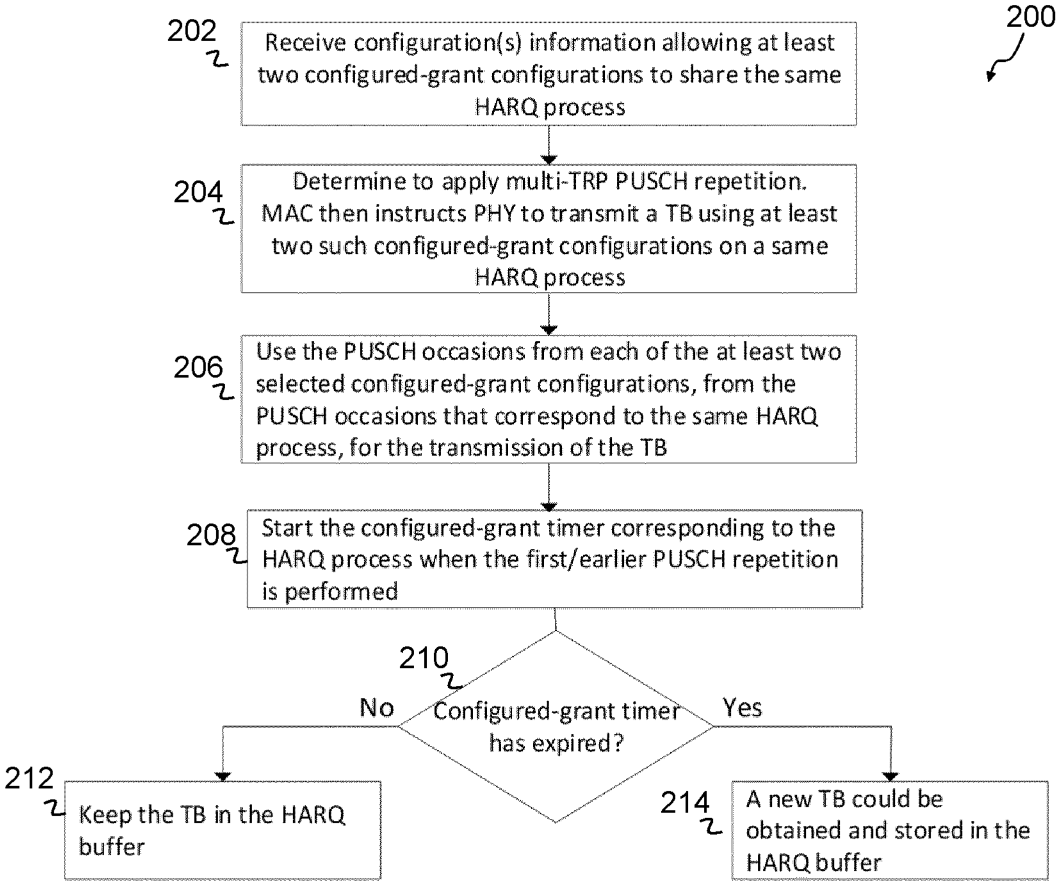

Examples of this alternative are illustrated in FIGS. 5 & 6 and FIG. 8. The examples of FIGS. 5 & 6 have been described previously.

FIG. 8 illustrates a method 200 comprising:

at block 202, receiving configuration(s) information allowing at least two configured grant configurations 31, 32 to share the same HARQ process;

at block 204, determining to apply multi-TRP PUSCH repetition. MAC then instructs PHY to transmit a TB 50 using at least two such configured grant configurations 31, 32 on a same HARQ process;

at block 206, using the PUSCH occasions (transmission occasions) from each of the at least two selected configured grant configurations 31, 32 (from the PUSCH occasions that correspond to the same HARQ process), for the transmission of the TB 50;

at block 208, starting the configured grant timer 74 corresponding to the HARQ process when the first/earlier PUSCH repetition is performed;

at block 210, determine if the configured grant timer 74 has expired.

If the configured grant timer 74 has not expired, then at block 21$_2$ keep the TB 50 in the HARQ buffer 76 and if the configured grant timer 74 has expired, then at block 214 allow a new TB to be obtained and stored in the HARQ buffer 76.

Alt.2: Explicit linkage/association of at least two configured-grant configurations:

At least two configured grant configurations 31, 32 are associated together via RRC. MAC instructs PHY to transmit a TB 50 using at least two such configured grant configurations 31, 32, i.e. a primary configuration 31 and at least one secondary configuration 32, and on corresponding HARQ processes, where the TB 50 is stored in the HARQ buffers 76 of all HARQ processes that are involved.

In a variant, the apparatus (UE 110) could be configured to not store the TB 50 in the buffer 76 of the HARQ process corresponding to the at least one secondary configuration 32.

The apparatus (UE 110) may determine/select the at least one secondary configured-grant configuration 32 based on some preconfigured rules/conditions. For instance, the apparatus (UE 110) may choose secondary CG configuration 32 based on CG parameters such as MCS, or SRI that results in the best "orthogonality" with respect to the primary CG configuration 31 depending; or based on TB 50 content such as LCH priority.

The configured-grant timers 74$_1$, 74$_2$ corresponding to the HARQ processes of the primary CG configuration 31 and the at least one secondary configuration 32 could be managed separately. And each configured-grant timer starts/restarts when the first PUSCH repetition using the corresponding configured-grant configuration 31, 32 is performed. The TB 50 stored in each HARQ buffer 76$_1$, 76$_2$ is kept until the corresponding configured-grant timer 74$_1$, 74$_2$ expires.

Alternatively, the TB 50 stored in the HARQ buffers 76 is kept in one buffer or all buffers until both configured-grant timers 74 expire.

Alternatively, the configured-grant timer 74$_2$ corresponding to the at least one HARQ process of the at least one secondary configuration 32 follows the same state (running/stopped/(re)started) of the configured-grant timer 74$_1$ corresponding to the HARQ process of the primary configuration 31—when these configurations 31, 32 are used for the transmission of the same TB 50.

The network can dynamically enable or disable all the above association operation. For instance, for configured-grant Type 2, such enabling/disabling can be done via DCI activating or reactivating any of the at least two linked configured-grant configurations. In case the operation mode is disabled, the apparatus (UE 110) may be configured to assume that this configuration is not associated/linked to the other at least one CG configuration and could thus be used as an independent CG configuration. In case the operation mode is enabled, the apparatus (UE 110) may be configured to assume that this CG configuration is associated/linked (again) to the other at least one CG configuration.

Figure 9:
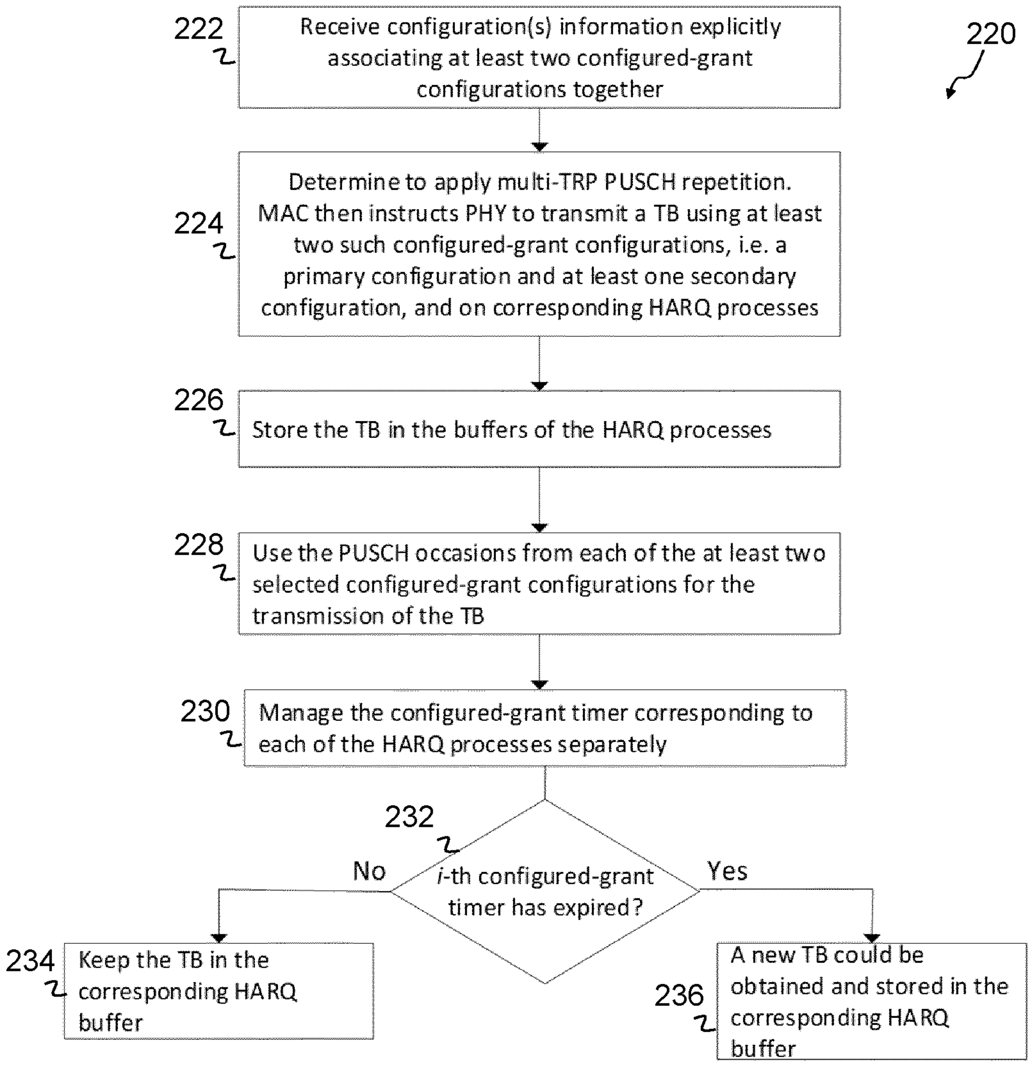

Examples of this alternative are illustrated in FIG. 7 and FIG. 9. The example of FIG. 7 have been described previously.

FIG. 9 illustrates a method 220 comprising:

at block 22$_2$, receiving configuration(s) information explicitly associating at least two configured grant configurations 31, 32 together;

at block 224, determining to apply multi-TRP PUSCH repetition. MAC then instructs PHY to transmit a TB 50 using at least two such configured grant configurations 31, 32 i.e. a primary CG configuration 31 and at least one secondary CG configuration 32, on corresponding HARQ processes;

at block 226, storing the TB 50 in the buffers of the HARQ processes;

at block 228, using the PUSCH occasions (transmission occasions) from each of the at least two selected configured grant configurations 31, 32 for the transmission of the TB 50;

at block 230, managing the configured grant timer 74 corresponding to each of the HARQ processes separately;

at block 232, determine (for each i) if the i-th configured grant timer 74$_i$ has expired. If the configured grant timer 74$_i$ has not expired, then at block 234 keep the TB 50 in the corresponding HARQ buffer 76$_i$ and if the configured grant timer 74$_i$ has expired, then at block 236 allow a new TB to be obtained and stored in the corresponding HARQ buffer 76$_i$.

Alt.3: Linkage/association of at least two HARQ processes:

At least two HARQ processes (identified by their respective ID) are associated together via RRC, which forms a set of associated HARQ PIDs. These HARQ processes may be pertained to different CG configurations 31, 32.

When a TB 50 is generated for a grant associated to one of a HARQ PIDs in this set, the MAC should store this TB 50 in the HARQ buffer 76 of this associated HARQ process as usual, and additionally copying it to HARQ buffer 76 of at least one other HARQ process in the same set.

The selection of the at least one other HARQ process in the same set (as well as the minimum/maximum number of HARQ processes in the same set that should be selected) could be made based on: Network configuration/instruction, content of the TB 50, and status of the HARQ buffer 76 of HARQ Processes (e.g. the MAC may skip the HARQ buffer that is already occupied by other TBs).

Figure 11:
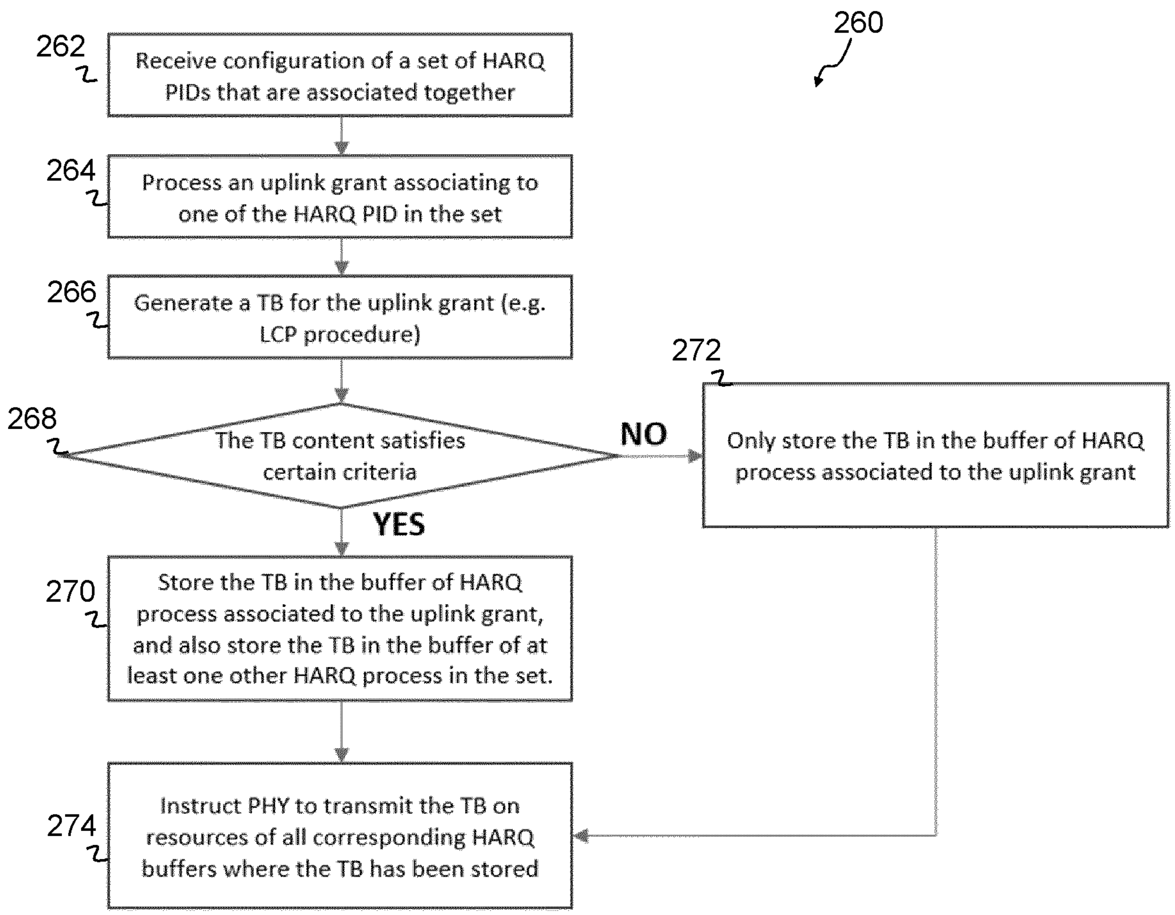

In one special case, the MAC may copy the TB 50 to HARQ buffer 76 of any other HARQ process in the same set if and only if the TB 50 satisfies certain criteria (see FIG. 11). For instance, the MAC may only copy the TB to any other HARQ buffer 76 if and only if the TB 50 conveys data from LCH with sufficiently high priority, or if the TB 50 conveys specific types of MAC CEs.

In one special case, the MAC may simply store the TB 50 to HARQ buffers 76 of all HARQ processes in the same set that are still available, regardless of the TB 50 content.

MAC instructs PHY to transmit a TB 50 on these HARQ processes using resources 21, 22 of their corresponding configured grant configurations 31, 32, where the TB 50 is stored in their HARQ buffers 76.

The remaining steps and variants/alternatives regarding the configured-grant timers and the dynamic enabling/disabling of the above operation are same/similar to Alt.2.

Figure 10:
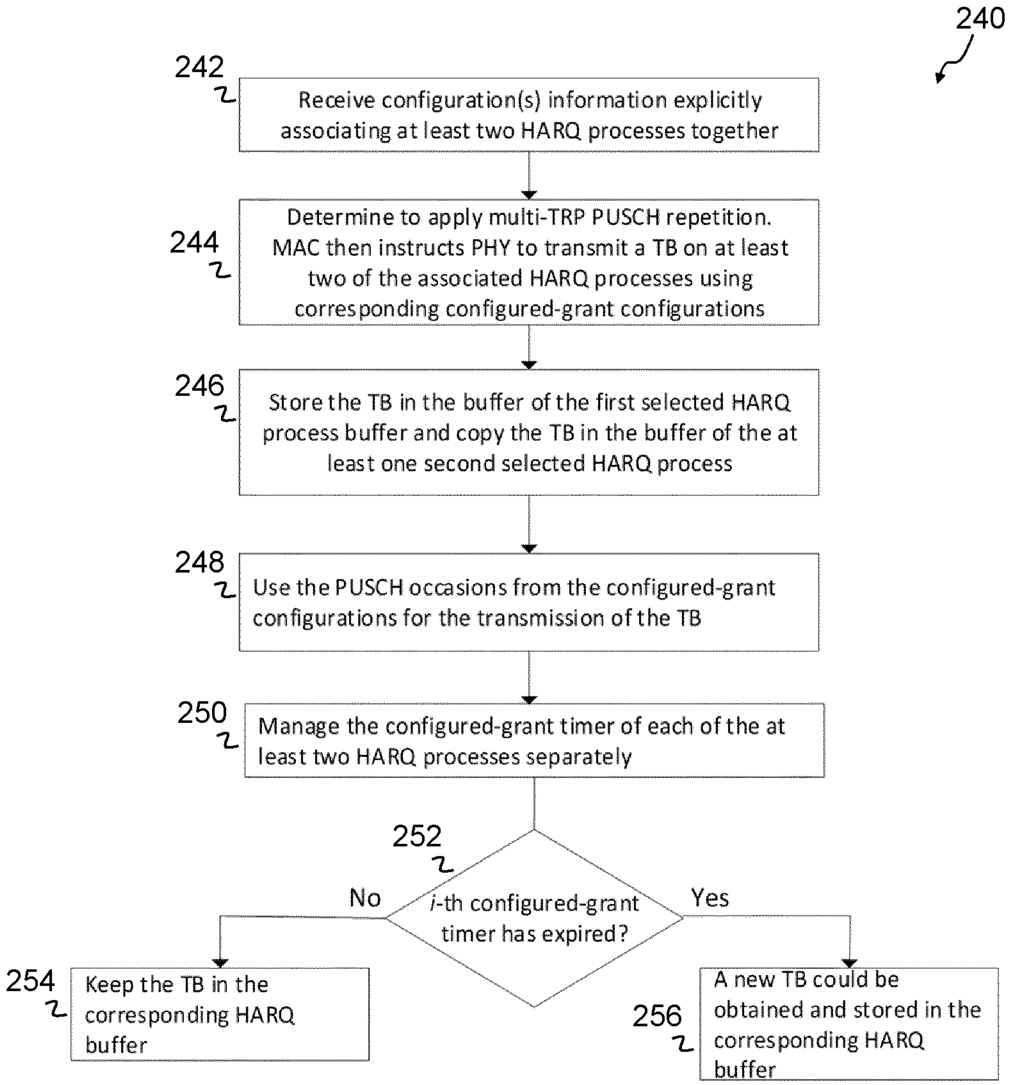

Examples of this alternative are illustrated in FIG. 7 and FIG. 10. The example of FIG. 7 have been described previously.

FIG. 10 illustrates a method 240 comprising:

at block 242, receiving configuration(s) information explicitly associating at least two HARQ processes together;

at block 244, determining to apply multi-TRP PUSCH repetition. MAC then instructs PHY to transmit a TB 50 on at least two of the associated HARQ processes using corresponding configured grant configurations 31, 32;

at block 246, storing the TB 50 in the buffer of the first selected HARQ process buffer $76_1$ and copy the TB 50 into the buffer $76_2$ of the at least one second selected HARQ process;

at block 248, using the PUSCH occasions (transmission occasions) from configured grant configurations 31, 32 for the transmission of the TB 50;

at block 250, managing the configured grant timer $74_1$, $74_2$ corresponding to each of the HARQ processes separately;

at block 252, determine (for each i) if the i-th configured grant timer $74_i$ has expired. If the configured grant timer $74_i$ has not expired, then at block 254 keep the TB 50 in the corresponding HARQ buffer $76_i$ and if the configured grant timer $74_i$ has expired, then at block 256 allow a new TB to be obtained and stored in the corresponding HARQ buffer $76_i$.

FIG. 11 illustrates an example of a case where the MAC copies the TB 50 to HARQ buffer 76 of any other HARQ process in the same set if and only if the TB 50 satisfies certain criteria.

FIG. 11 illustrates a method 260 comprising:

at block 262, receiving configuration of a set of HARQ process identifiers (PIDs) that are associated together;

at block 264, processing an uplink grant associating to one of the HARQ PID in the set;

at block 266, generating a TB 50 for uplink grant;

at block 268, determine if the content of the TB 50 satisfies certain criteria.

If the content of the TB 50 satisfies certain criteria, then at block 270 store the TB 50 in the buffer 76 of the HARQ process associated to the uplink grant, and also store the TB 50 in the buffer 76 of at least one other HARQ process in the set.

If the content of the TB 50 does not satisfy certain criteria, then at block 272 only store the TB 50 in the buffer 76 of the HARQ process associated to the uplink grant. There is no storage of the TB 50 in the buffer 76 of at least one other HARQ process in the set.

After blocks 270 and 272, at block 274, instruct transmission of the TB 50 on resources of all corresponding HARQ buffers where TB has been stored.

Alt.4 (could be considered in association with any of Alt.1, Alt.2, Alt.3) Dynamic indication of CG configuration and/or HARQ PID for PUSCH repetition:

In this example, the gNB 120 assigns a dynamic grant (via DCI) for the apparatus (UE 110) to transmit a TB 50. A new field in the DCI is used to indicate instructions relating to PUSCH repetition, for example:

An indication of at least one CG configuration index corresponding to the CG resources 21, 22 where the apparatus (UE 110) should repeat PUSCH transmission of the TB 50. This is additional to the PUSCH transmission indicated via the dynamic grant itself.

An indication of at least one HARQ PID corresponding to the HARQ buffer 76 where the apparatus (UE 110) should also store the TB 50. This is additional to the default HARQ PID indicated in dynamic grant itself. The apparatus (UE 110) should also transmit the TB 50 using the resources 21, 22 (e.g. a CG 31, 32) corresponding to the additional HARQ PID that has been indicated.

For Alt.2 and Alt.3 where at least two HARQ processes and/or at least two configured-grant configurations are being used for multi-TRP PUSCH repetition, upon PDCCH reception with CS-RNTI for retransmission or upon PDCCH reception with C-RNTI for initial transmission or retransmission, in which one of the at least two HARQ processes is indicated:

Start or restart both configured-grant timers 74

Alternatively, start or restart only the configured-grant timer 74 corresponding to the indicated HARQ process.

For all the alternatives above, one variant regarding the configured-grant timer 74 is to configure a common timer for the at least two HARQ processes/configured-grant configurations 31, 32, where this timer 74 could be at least applicable/used when the same TB 50 is transmitted using these two HARQ processes/configured-grant configurations 31, 32.

The solutions enable multi-TRP configured-grant PUSCH repetition operation by using more than one configured-grant configuration. The solutions allow exploiting the configured-grant operation to achieve beam diversity by transmitting/repeating the same TB 50 multiple times towards different TRPs 120. Such operation is beneficial from both reliability and latency perspectives.

Figure 12:
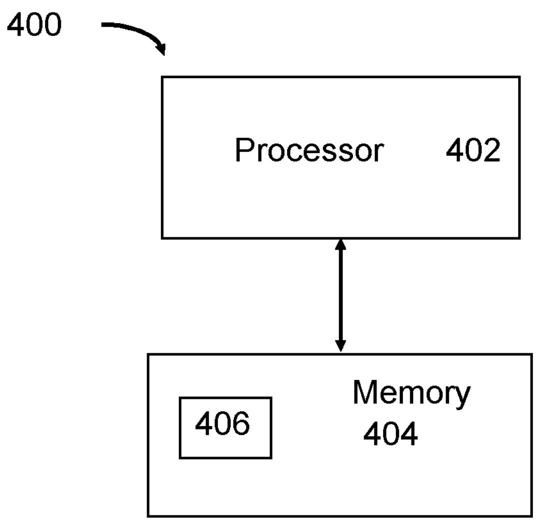

FIG. 12 illustrates an example of a controller 400. Implementation of a controller 400 may be as controller circuitry. The controller 400 may be implemented in hardware alone, have certain aspects in software including firmware alone or can be a combination of hardware and software (including firmware).

As illustrated in FIG. 12 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 110 when loaded into the processor 402. The computer program instructions, of the computer program 406, provide the logic and routines that enables the apparatus to perform the methods illustrated and/or described. The processor 402 by reading the memory 404 is able to load and execute the computer program 406.

The apparatus 110 therefore comprises:

at least one processor 402; and at least one memory 404 including computer program code the at least one memory 404 and the computer program code configured to, with the at least one processor 402, cause the apparatus 110 at least to perform:

obtaining at least a first uplink resource 21 associating 41 to a first configured grant configuration 31 and a second uplink resource 22 associating 42 to a second configured grant configuration 32 based on the at least one configuration message 10;

causing transmission of a transport block 50 on the first uplink resource 21 associating 41 to the first configured grant configuration 31 via a first channel 81; causing transmission of the transport block 50 on the second uplink resource 22 associating 42 to the second configured grant configuration 32 via a second channel 82, wherein the first configured grant configuration 31 is different to the second configured grant configuration 32, and wherein the first channel 81 is different to the second channel 82.

Figure 13:
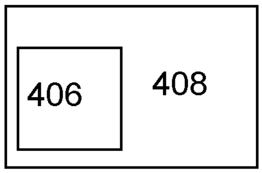

As illustrated in FIG. 13, the computer program 406 may arrive at the apparatus 110 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 406. The delivery mechanism may be a signal configured to reliably transfer the computer program 406. The apparatus 110 may propagate or transmit the computer program 406 as a computer data signal.

Computer program instructions for causing an apparatus to perform at least the following or for performing at least the following:

obtaining at least a first uplink resource 21 associating 41 to a first configured grant configuration 31 and a second uplink resource 22 associating 42 to a second configured grant configuration 32 based on the at least one configuration message 10;

causing transmission of a transport block 50 on the first uplink resource 21 associating 41 to the first configured grant configuration 31 via a first channel 81; causing transmission of the transport block 50 on the second uplink resource 22 associating 42 to the second configured grant configuration 32 via a second channel 82, wherein the first configured grant configuration 31 is different to the second configured grant configuration 32, and wherein the first channel 81 is different to the second channel 82.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the Figures may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products;

distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example. Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
at least one processor; and
at least one memory including computer program code, the at least one memory and the computer program code configured to, with the at least one processor, cause the apparatus at least to:
receive at least one configuration message;
determine at least a first uplink resource associating to a first configured grant configuration and a second uplink resource associating to a second configured grant configuration based on the at least one configuration message;
generate a transport block;
transmit the transport block on the first uplink resource associating to the first configured grant configuration via a first channel; and
transmit the transport block on the second uplink resource associating to the second configured grant configuration via a second channel, wherein the first configured grant configuration is different to the second configured grant configuration, and wherein the first channel is different to the second channel,
wherein one or more timers reserve first uplink resources associating to a first configured grant configuration for re-transmission of the transport block via the first channel and reserve second uplink resources associating to a second configured grant configuration for re-transmission of the transport block via the second channel,
wherein separate buffers are available for each timer for storing the transport block, and
wherein where more than one buffer is used to store the transport block, the buffers are cleared independently in dependence upon their respective timers or the buffers are cleared together in dependence upon one of the respective timers.

2. The apparatus as claimed in claim 1, wherein the transmitting the transport block on the first uplink resource via the first channel comprises:
performing at least one repetition of the transport block on at least one transmission occasion of the first uplink resource and via the first channel; and
wherein the transmitting the transport block on the second uplink resource via the second channel comprises:
performing at least one repetition of the transport block on at least one transmission occasion of the second uplink resource and via the second channel.

3. The apparatus as claimed in claim 2, comprising one or more timers, wherein repetition of the transport block on the first uplink resource via the first channel and repetition of the transport block on the second uplink resource via the second channel are contemporaneous and occur with a time period controlled by the one or more timers.

4. The apparatus as claimed in claim 2, comprising a first timer and a second timer, wherein availability of the at least one transmission occasion defined by the first uplink resource is dependent upon a status of the first timer started by an initial transmission of the transport block on the first uplink resource via the first channel, and wherein availability of the at least one transmission occasion defined by the second uplink resource is dependent upon a status of the second timer started by an initial transmission of the transport block on the second uplink resource via the second channel.

5. The apparatus as claimed in claim 1, wherein the first uplink resource comprises at least one transmission occasion of a physical uplink shared channel (PUSCH) and wherein the second uplink resource comprises at least one transmission occasion of the PUSCH, wherein the first channel is associated with a first transmission/reception point (TRP) and the second channel is associated with a second TRP different to the first TRP, the apparatus enabling multi-TRP configured grant PUSCH repetition operation.

6. The apparatus as claimed in claim 1, wherein the configuration message causes association, at the apparatus, of the first configured grant configuration and the second configured grant configuration.

7. The apparatus as claimed in claim 1, wherein the configuration message explicitly associates the first configured grant configuration and the second configured grant configuration.

8. The apparatus as claimed in claim 1, wherein the configuration message associates a first hybrid automatic repeat request (HARQ) process corresponding to the first configured grant configuration and a second HARQ process corresponding to the second configured grant configuration.

9. The apparatus as claimed in claim 1, wherein the apparatus is further caused to:

select at least one of the first uplink resource and the second uplink resource from a pool of available uplink resources.

10. The apparatus as claimed in claim 1, wherein the first configured grant configuration enables, at the apparatus, periodic transmission on first specific resource blocks, and wherein the second configured grant configuration enables, at the apparatus, periodic transmission on second specific resource blocks, wherein the first and second resources blocks are distinct.

11. The apparatus as claimed in claim 1, wherein the first channel is associated with a first transmission/reception point (TRP) and the second channel is associated with a second TRP different to the first TRP; and/or the first channel is associated with a first uplink beam and the second channel is associated with a second uplink beam.

12. The apparatus as claimed in claim 1, wherein the apparatus is further caused to:

receive at least one further configuration message;

determine at least a third uplink resource associating to a third configured grant configuration; and transmit the transport block on the third uplink resource associating to the third configured grant configuration via a third channel, wherein the third configured grant configuration is different to the first and second configured grant configurations, and wherein the third channel is different to the first and second channels.

13. The apparatus as claimed in claim 1, wherein transmission or repetitions of the transport block on the first uplink resource via the first channel use a HARQ process identified by a HARQ process identifier and wherein transmission or repetitions of the transport block on the second uplink resource via the second channel use the same HARQ process identified by the same HARQ process identifier.

14. The apparatus as claimed in claim 1, wherein a single timer reserves resources for re-transmission of the transport block, with repetitions, via the first channel and re-transmission of the transport block, with repetitions, via the second channel.

15. The apparatus as claimed in claim 1, wherein transmission or repetitions of the transport block on the first uplink resource via the first channel use a first HARQ process identified by a first HARQ process identifier and wherein transmission or repetitions of the transport block on the second uplink resource via the second channel use a second HARQ process identified by a second HARQ process identifier, different to the first HARQ process identifier.

16. The apparatus as claimed in claim 1, wherein the at least one configuration message controls an association of the first configured grant configuration and the second configured grant configuration; or wherein the at least one configuration message controls an association of a first HARQ process identifier and a second HARQ process identifier.

17. The apparatus as claimed in claim 1, wherein the apparatus is further caused to:

select a second HARQ process identifier from a set of available HARQ process identifiers comprising a first HARQ process identifier.

* * * * *